United States Patent Office 3,655,627
Patented Apr. 11, 1972

3,655,627
PROCESS FOR PREPARING SOLID PARTICLES OF UREA-URETHANE POLYMERS
George J. Hutzler, Williamsville, and Basil S. Farah, Elma, N.Y., assignors to Textron Inc.
No Drawing. Filed June 19, 1969, Ser. No. 834,859
Int. Cl. C08g 22/04
U.S. Cl. 260—77.5 AA                                    27 Claims

ABSTRACT OF THE DISCLOSURE

Urethane prepolymer compositions made from diisocyanates and polyols are reacted in an aqueous medium with primary diamines, e.g., 1-amino-3-aminomethyl-3,5,5-trimethyl cyclohexane, to give solid, particulate urea-urethanes which can be formed as films such as coatings on a substrate or as independent sheets, or the urea-urethanes can be formed as materials of greater thickness or as fibers. The products exhibit good strength and elastomeric characteristics and other desirable properties, and especially when made from aliphatic polyols, aliphatic diisocyanates and aliphatic diamines, the products have high resistance to the discoloring effects of ultra-violet light. The polyol of the composition can, for example, have as its major component aliphatic polyol. The glycols, especially the polyether glycols, are suitable polyol reactants. A variety of diisocyanates can be employed and can be aliphatic, cycloaliphatic, or aromatic.

---

This invention relates to the manufacture of urea-urethanes in an aqueous medium. More particularly, the invention concerns the making of urea-urethanes by a process which directly provides the product in the form of particulate solids which settle from the aqueous medium. The urea-urethanes of this invention are made in high yields by reaction of prepolymers formed from diisocyanates and polyols, with primary diamines in an essentially aqueous reaction medium and the resulting urea-urethanes are particulate, solid materials having advantageous properties. The solids and the reaction medium are such that the solids are not emulsified readily and more or less immediately settle from the reaction mixture at least when the mixture is not agitated. The solids can be separated from the liquid reaction medium and, if desired, further processed as by drying. The solids can be formed into various articles of desired shapes such as films, coatings and fibers which articles can have elastomeric properties. Thus the urea-urethanes can be formed as coatings on various substrates, as independent film or sheet materials or used in other desirable applications. The urea-urethanes prepared from aliphatic polyols, aliphatic diisocyanates and aliphatic diamines exhibit outstanding resistance to the degradative and yellowing action of ultra-violet light rays. The urea-urethanes are stable, possess excellent abrasion, strength, and elongation properties and when applied as coatings the urea-urethanes adhere firmly to various suitable substrates.

The preparation of urea-urethanes by reaction of polyurethane prepolymers is well known. These products are most often obtained as solutions in organic solvents, stable aqueous dispersions or more or less unitary solid masses. Various aqueous systems are shown in U.S. Pats. Nos. 2,968,575; 3,148,173; 3,213,049; 3,281,397; 3,294,724; and 3,437,624. Aside from the expense of organic solvents, it is readily apparent that solutions or aqueous dispersions of urea-urethanes are rather costly to ship should one desire to make the solutions or dispersions at one location and use them at any place which is a substantial distance from the point of manufacture. Heretofore, the aqueous dispersions have been coagulated by special techniques to obtain solid urea-urethanes but it is desired to avoid the expense and inconvenience of these additional processing steps. Also it is very difficult to filter the solids from the reaction medium and to control their particle sizes. Where the urea-urethanes have been formed as more or less unitary masses of substantial size, they could be readily shipped without undue expense, but if they were to be more advantageously used the large masses had to be broken into small particle form to facilitate further processing. Great difficulty is experienced in trying to reduce the rubbery particles to smaller sizes, especially since the urea-urethanes often have high tear strengths and hardness. It is therefore highly desirable to develop a process in which small particle form urea-urethanes are produced directly from the reaction of a polyurethane prepolymer and diamine.

By the present invention, it has been discovered that prepolymer polyurethanes containing free isocyanate-groups, can be reacted in an aqueous medium in which water is the continuous phase, with primary diamines while the reaction mixture is agitated to the extent that there is directly formed particulate, solid urea-urethane polymers having the highly desirable characteristics discussed above. The resulting product is an aqueous slurry having the solid polymer in particle form in sizes such that the particles are not emulsified and readily separate or settle from the reaction medium at least when agitation is stopped. The reaction product is thus an unstable dispersion. The separation can be obtained without the necessity of performing special coagulating techniques such as by the addition of salts or acids or by freezing. Moreover, the elastomeric polymer particles are very easily separated from the aqueous reaction medium by the usual liquid-solid separation techniques, e.g., filtration, centrifugation, etc.

The particle sizes of the solid urea-urethane products can be easily controlled by the extent to which the medium is agitated during the formation of the solid particles. In general, as agitation becomes more severe the particles become smaller. The solid urea-urethane particles usually have diameters of at least about 0.001 inch, say up to about 0.3 inch, and preferably the particles are about 0.01 to 0.1 inch, in diameter. The size of the solid urea-urethane particles corresponds in general to the size of the urethane prepolymer particles present in the reaction mixture when the particles are contacted with the diamine. Although the size of the urethane prepolymers particles in the reaction mixture depends on the severity of the agitation, the size can also be influenced by other process conditions such as the nature and amount of any surfactant present. Often the presence of a surfactant or emulsifier reduces the intensity of agitation needed to give particles of a given size. This effect in some types of reaction equipment having less severe agitation capabilities, may even make the presence of a surfactant necessary to get the desired product particle sizes. Too severe agitation may lead to undesirable, stable emulsions or latexes. Thus by the selection of the reaction conditions solid urea-urethane particles of controlled and desired size can be obtained and these sizes can be relatively uniform. The resulting particles can be separated, handled and further processed with ease.

The urea-urethane solids can be formed into various shapes, preferably after drying, and with or without dissolution in an organic solvent. Thus the thermoplastic solids can be directly cast into films through the action of heat and/or pressure or by solvent casting technique. The solids can also be made into fibers, coatings or other desirable forms. The urea-urethane polymers made from aliphatic reactants exhibit excellent resistance to yellowing under the influence of ultraviolet light.

The urethane prepolymers of the invention are essentially made by reaction of diisocyanates with urethane-forming polyols. In one embodiment of the invention a major weight portion of the polyol component has a molecular weight of at least about 400. The prepolymers are often in an essentially liquid state either as the polymer per se or dissolved in a solvent, and the prepolymers are generally stable in the sense that they will not cure to an insoluble solid unless further contacted with water, polyol or other active-hydrogen containing material. These prepolymers can have a free isocyanate group content of about 1 to 15, often at least about 2 and preferably about 2 to 10, weight percent based on polymer content or solids.

Although the use of diisocyanate is essential in preparing the prepolymers of this invention, minor amounts of other polyisocyanates can be employed providing the compositions are not unduly deleteriously affected. In making the urethane prepolymer one or more of a variety of hydrocarbon diisocyanates can be reacted. Thus, the diisocyanate may be aliphatic, aromatic or mixed aliphatic-aromatic structures. The aliphatic and cycloaliphatic diisocyanates are preferred, especially when making urea-urethanes exhibiting good resistance to the yellowing effects of ultraviolet light. The isocyanates can be substituted with non-interfering groups such as aliphatic hydrocarbon radicals, e.g., lower alkyl or other groups having no active hydrogen as determined by the Zerewitinoff test, J. Am. Chem. Soc., 49, 3181 (1927). The diisocyanate often has at least about 6 carbon atoms and usually does not have more than about 40 carbon atoms. Diisocyanates of about 8 to 20 crbon atoms in the hydrocarbon group are preferred. Suitable diisocyanates include di-(isocyanato cyclohexyl) methane, 1-isocyanato-3-isocyanatomethyl-3,5,5-trimethyl cyclohexane, hexamethylene diisocyanate, methylcyclohexyl diisocyanate, 2,4,4-trimethylhexamethylene diisocyanate, 2,6-tolylene diisocyanate, 2,4-tolylene diisocyanate, p-phenylene diisocyanate, p,p'-diphenylmethane diisocyanate, 1,5-naphthalene diisocyanate, etc. The use of aromatic diisocyanates usually lowers the resistance of the urea-urethane polymers to the effects of ultra-violet light.

An essential component used in making the prepolymer compositions of the present invention is, as noted one or more polyols. The polyols can be aliphatic, cycloaliphatic, aromatic or mixed structures of these types. The polyols preferred contain a major amount of aliphatic polyols having a molecular weight of at least about 400. Also, the polyol is preferably composed to a major molar extent of diol including the ether diols, although triols or other polyols having greater than three hydroxyl groups as well as their mixtures with diols can be employed. The polyols have at least two hydroxyl groups, preferably for the most part attached to aliphatic carbon atoms, and may be selected from a wide variety of polyhydroxyl materials. Aside from the hydroxy groups the structure of the polyol is usually hydrocarbon in nature, but the polyols can be further substituted. The polyols may often have an average molecular weight of up to about 5000 or more, but preferably have a molecular weight of about 400 to 4000.

Among the wide variety of polyols which can be used in this invention are those represented by the formula:

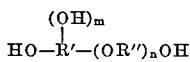

in which R' is a hydrocarbon radical, preferably aliphatic and saturated, and R" is an alkylene radical of 2 to 4, preferably 2 to 3, carbon atoms. R' preferably has 2 to 12, advantageously 2 to 6, carbon atoms. The letter $n$ represents a number from 0 to about 50, depending on the molecular weight desired, while the letter $m$ is 0 to 2 or more. When $n$ is other than 0, R' may often be the same as R".

Suitable aliphatic alcohols include the polyether glycols of up to about 5000 or more molecular weight, such as the polyoxyethylene glycols, polyoxypropylene glycols, and polyoxybutylene glycols. The latter materials include the straight chain polyoxybutylene glycols often referred to as polytetramethylene ether glycols, as well as the branched chain polyoxybutylene glycols, for instance, made from 1,2- and 2,3-butylene oxides. Among the relatively low molecular weight polyols which can be used are trimethylol propane, ethylene glycol, propylene glycol, butane diols, trimethylol ethane, 1,6-hexamethylene glycol, 1,2,6-hexanetriol, glycerol, etc.

Others among the polyols useful in the invention include the hydroxy esters such as castor oil, polyol-modified castor oils, other polyol-modified fatty oils and hydroxy-terminated polyesters. Hydroxy-terminated polyester materials are generally made by reaction of one or more polyhydroxy materials, such as the aliphatic polyols mentioned above, with one or more aliphatic, including cycloaliphatic, or aromatic polycarboxylic acids or esters, and such polyesters can often have hydroxyl values in the range of about 25 to 150. Frequently in these polyesters, the polyhydroxy alcohols are predominantly diols and the acids are dicarboxylic acids, including their anhydrides, and preferably contain from about 4 to 50 carbon atoms, e.g., phthalic acid, adipic acid, sebacic acid, dimers of olefinically-unsaturated monocarboxylic acids, such as linoleic acid dimer, etc. Modified castor oil partial esters can be made by ester interchange of the oil with polyols such as low molecular weight polyols, including glycols, glycerine, pentaerythritol, etc.

The isocyanate-polyol prepolymers are stable and preferably in an essentially liquid state, at least when in a solvent. There is a greater tendency to produce intractable prepolymer gels when the polyol contains a crosslinking component which has at least three hydroxylgroups per molecule. The prepolymer compositions of the present invention include those in which at least a portion of the polyol reactant has at least three hydroxyl groups per molecule such as those mentioned before, including the polyols of the defined formula where $m$ is 1 to 2, e.g. trimethylol propane, trimethylol ethane, 1,2,6-hexanetriol, etc., and their alkylene-oxide derived polyethers. However, the amount or degree of functionality of the polyol should not be so great that an intractable or non-reactive prepolymer is obtained. Such cross-linking aliphatic polyols often have about 3 to 12, preferably about 3 to 6, carbon atoms, although their polyethers preferably have molecular weights of at least about 400. When the polyol component used in making the prepolymer contains cross-linking polyol, essentially the entire polyol may have at least about three hydroxyl groups per molecule, but large amounts of such polyol or polyols of high functionality may preclude the formation of elastomers. It may be desirable to limit the hydroxyl groups supplied by the cross-linking polyol to up to about 30, preferably up to about 10, mole percent based on total hydroxy groups.

The polyurethane-type prepolymer reaction products of the present invention can be made by simultaneous reaction of excess isocyanate and polyol. Alternatively, the diisocyanate can be reacted with part or all of one or more of the polyols prior to the reaction with the remaining portion of these materials. Stepwise mixing of the diisocyanate with the polyols may be used to enhance temperature control. The reaction temperatures for making the various urethane prepolymers of the present invention are often up to about 150° C., with about 50 to 130° C. being preferred; and the reaction is preferably continued until there is essentially little, if any, unreacted hydroxyl functionality remaining. As noted above variations in the nature and amounts of the polyol or polyol mixtures used in the preparation of the compositions of this invention can be made without materially affecting the stability of the compositions.

Catalysts can be used in forming the prepolymers to accelerate the rate of reaction. Typically the catalysts can be organotin compounds, for example dibutyl tin dilaurate and stannous octoate. Other useful catalysts include tertiary aliphatic and alicyclic amines, such as triethyl amine, triethanol amine, tri-n-butylamine, triethylene diamine, alkyl morpholines and the like. Complex mixtures containing such catalysts in modified form may also be employed.

The prepolymers of the present invention can be prepared in the presence of solvent which is essentially inert in this system or the solvent can be added to the prepolymer. The solvent if present during formation of the prepolymer insures that the reactants are in the liquid state and the solvent permits better temperature control during the reaction by serving as a heat sink and, if desired, as a refluxing medium. Various solvents which do not contain a reactive hydrogen can be employed and among the useful organic solvents are aromatic hydrocarbons, esters, ethers, keto-esters, ketones, glycol-ether-esters, chlorinated hydrocarbons, pyrrolidones, hydrogenated furans, and the like and mixtures thereof. The amount of solvent employed, if any, can vary widely and large volumes may be uneconomic or give materials with undesirably or inconveniently low viscosity. Often about 0.01 to 6 weights of solvent, preferably about 0.03 to 3 weights of solvent, per weight of the total isocyanate and polyol in the prepolymer can be used. Among the suitable normally liquid solvents are toluene, xylene, ethylbenzene, 2-ethoxy-ethyl acetate, 1,1,1-trichloroethane, methyl isobutyl ketone, dimethylformamide, dimethylsulfoxide, dioxane, N-methyl pyrrolidone, tetrahydrofuran, etc. and their mixtures, and it is preferred that the solvent not contain more than about 10 carbon atoms per molecule.

In preparing the urea-urethane compositions of this invention, the urethane prepolymer of diisocyanate and polyol, can be reacted with one or more water-soluble, primary diamines in the presence or absence of a solvent for the prepolymer to obtain the particulate, solid urea-urethane. The reaction is conducted in the liquid phase with water serving as the continuous reaction phase. The prepolymer is dispersed in water by, for instance, any suitable means of agitation or dispersing procedure. The reaction can be at elevated, reduced or ambient temperatures. Convenient temperatures are from about 10 to 120° C. or more, preferably about ambient up to about 100° C., but if elevated pressures are employed higher temperatures could be used. The reaction can be for a period of a few minutes or up to several days and generally one wishes to continue the reaction until a good yield of solids is obtained. Various ways of combining the reactants can be used providing gelling of the reaction mixture or latexes are not formed. We prefer that the diamine not be in excess in the presence of the prepolymer and this can be provided, for example, by adding the diamine to an aqueous dispersion of the prepolymer. Excess diamine can however, be used if the intensity of agitation is sufficiently high to give the desired small particle form product of this invention. Generally contact of the prepolymer with the water in the absence of diamine is restricted in order not to evoke undue reaction between the prepolymer and water. Thus the diamine is combined with the prepolymer more or less immediately after the prepolymer and water are combined, for instance, within about five or six minutes, preferably within about two or three minutes. Also an emulsifying agent can be present in the reaction system and the agent can be cationic, nonionic or anionic and is advantageously the later. Preferably the emulsifying agent is water-soluble, and it is further advantageous if the surfactant is in the aqueous reaction mixture when the diamine is combined. Conveniently, the emulsifier or surface-active agent can be used in amounts of about 0.01 to 30 or more, preferably about 0.05 to 25, weight percent of the water in the reaction medium. The amount of surface-active agent employed can be affected by the chemical structure of the agent or the reactants, and the presence of the surfactant may detract from the physical properties of the product, for instance, in terms of tensile strengths and elongation. The amount of water serving as the continuous phase is often about 0.5 to 30 volumes per volume of prepolymer liquid, preferably about 2 to 15 volumes per volume of prepolymer liquid. In any event, the amount of water is sufficient to form the continuous reaction phase and excessively large amounts of water can give rise to unnecessary handling expense.

The amounts of the urethane prepolymer and amine reacted and the reaction conditions are chosen so that substantially all of the isocyanate content of the prepolymer is reacted on a weight basis. Since an approximately stoichiometric amount of amine is used the free isocyanate content of the urea-urethane is usually less than about 1 weight percent based on polymer solids, and often this free isocyanate content is less than about 0.5 percent. The urea-urethane polymer obtained in the aqueous system is essentially non-cellular and thus is distinguished from a foam.

The primary diamines employed in this invention can be selected from a variety of suitable water-soluble diamines. Thus, the diamine may be aliphatic, cycloaliphatic, aromatic or mixed structures of these types. Often the amine is a hydrocarbon diamine having up to about 40 or more carbon atoms, preferably about 2 to 15 carbon atoms, and may contain other substituents, e.g. secondary amine or other groups which do not have hydrogen atoms as reactive with isocyanate groups as primary amine groups. The preferred diamines are aliphatic or cycloaliphatic structures which contribute to improved resistance of the polymer products to the degradative and yellowing effects of ultraviolet light. Aside from the diamine a minor amount of other reactant can be present. Among the useful diamines are ethylene diamine, propylene diamine, hexamethylene diamine, para-phenylene diamine, methylene dianiline, trimethylhexamethylene diamine, tolylene diamine, hydrogenated diphenylmethane diamine, 4,4'-methylene-bis(2-chloroaniline), etc. Preferred diamines are alkyl or cycloalkyl diamines, e.g. 1-amino-3-aminomethyl-3,5,5-trimethyl cyclohexane.

The urea-urethanes of this invention can be employed in any way desired to take advantage of the characteristics of the products, for instance, the urea-urethanes may be used as coatings, adhesives, laminants or flocculants or formed into relatively thick sheets or other film-like materials. Due to the elastomeric properties of the products they may be applied and employed in a manner to take advantage of such characteristics. The film-type products generally have a thickness of up to about 100 mils or more and often the coating compositions have a thickness of up to about 10 mils. The urea-urethanes can be formed into various materials or articles of greater cross-sectional dimensions, and can be employed in the various ways known in the art for utilization of these types of materials. The compositions can contain additives to impart special properties such as plasticizers, pigments, fillers, etc., also the solid substrates bearing the coating may be specially-treated materials, including flammable members impregnated with fire-resistanct chemicals or coated with a sealant.

The present invention will be further illustrated by the following examples. In the technique the polyol component was initially azeotroped to remove water, and subsequently the urethane prepolymer-forming reaction was conducted under an inert atmosphere in the usual manner. In some examples the urea-urethane slurry was heated to reduce solvent swelling and stickiness of the particles. In all examples the size of the particles of urea-urethane were primarily in the range of 10 to 100 mesh. In the example the parts and percentages are by weight unless designated otherwise.

EXAMPLE I

This example describes the preparation of a color retentive elastomer derived from 4,4'-dicyclohexylmethane diisocyanate prepolymer and cured with 1-amino-3-aminomethyl-3,5,5-trimethyl cyclohexane.

The prepolymer was made from 1000 grams (1 mole) polypropylene glycol of molecular weight 1025, 340 grams (0.166 mole) of polypropylene glycol of molecular weight 2025 and 595 grams (2.27 moles) of 4,4-dicyclohexylmethane diisocyanate. When the diisocyanate was added to the glycol, a slight heat of reaction developed. The temperature of the batch was held at 80° C. under gaseous nitrogen for about 5 hours to complete the formation of prepolymer. After cooling, this prepolymer had a viscosity of 32 stokes, a Gardner color of 1 minus and a free isocyanate value of 5.73 percent.

A solution of 4.95 grams 1-amino-3-aminomethyl-3,5,5-trimethyl cyclohexane in 200 grams of water was stirred at room temperature in a quart size Waring Blendor at 19,000 r.p.m. and 51 grams of the prepolymer were added in a thin stream. After stirring for about 5 minutes, the particulate, solid product was filtered off, washed with cold water until the washings became neutral, and dried at room temperature in a forced air oven for 24 hours. The yield of elastomeric polymer was quantitative. A sample of the product was dissolved in dimethylformamide at a nonvolatile concentration of 23 percent by weight to produce a solution having a Gardner-Holdt viscosity of Z4½ and a Gardner color of 1 minus. Films cast from the dimethylformamide solution and air dried had tensile strengths of 5000–6000 pounds per square inch and elongations of 450–550 percent. The films were clear and colorless and retained their clarity and color after exposure to ultraviolet radiation.

EXAMPLE II

This example illustrates the preparation of a resin from a tolylene diisocyanate-based prepolymer using 1-amino-3-aminomethyl-3,5,5-trimethyl cyclohexane as the curing agent. Twenty three hundred and twenty grams (4.58 equivalents) of polytetramethylene glycol of 1020 molecular weight and 860 grams (0.81 equivalent) of polytetramethylene glycol of molecular weight 2100 were charged to a glass flask provided with a heating mantel, a mechanical stirrer, a reflux condenser, a water-trap, a thermometer and an inlet for gaseous nitrogen. This mixture was dried by heating and stirring with gaseous nitrogen flowing through the system at 194 to 200° C. for one hour. During this period 6 grams of liquid distilled over and was collected in the water trap. The temperature of the batch was allowed to drop to 60° C. when 951 grams (10.9 equivalents) of a mixture of 80 percent 2,4- and 20 percent 2,6-tolylene diisocyanate was added. The temperature was held in the range 80 to 87% C. for 3 hours. After cooling to room temperature the resulting prepolymer analyzed 97.2 percent nonvolatile, viscosity 83.4 stokes, Gardner color 3+ and a free isocyanate value of 5.58 percent (NCO).

A solution of 5.4 parts 1-amino-3-aminomethyl-3,5,5-trimethyl cyclohexane in 250 parts water in a quart size Waring Blendor was stirred at 19,000 r.p.m., and 50 parts of the prepolymer were added in a thin stream. The reaction mixture was stirred at 19,000 r.p.m. at room temperature, for ½ hour, filtered, and washed to recover the solid product which was air dried at room temperature. A water-insoluble, granular, rubbery resin was obtained in quantitative yield. A portion of the resin was melt pressed into films at 140° C. and 10,000 pounds per square inch. Amber colored films were obtained having tensile strengths of 5500–6500 at 420–460% elongation.

EXAMPLE III

In this example, the prepolymer is dissolved in dimethylformamide prior to addition to the curing agent. The prepolymer prepared as in Example I, is added to a water solution of 1-amino-3-aminomethyl-3,5,5-trimethylcyclohexane according to the procedure of Example I except the prepolymer is in the form of a 50% solution by weight in dimethylformamide. The rubbery resin particles obtained are color-retentive and films cast therefrom have a tensile strength of about 4000 pounds per square inch and elongation at break of about 630 percent. The resin has a Shore A Durometer hardness of 75 and Shore D hardness of 25.

EXAMPLE IV

The use of an emulsifier is illustrated in this example, which used a 3-liter, 3 neck, round bottomed flask equipped with a water-cooled reflux condensor, an addition funnel and a thermometer. The agitator in the flask is a flat blade 2.5 cm. high by 10 cm. long and is positioned in the flask as near its bottom as possible without scraping the flask. The flat side of the blade is perpendicular to the direction of rotation of the blade. About 180 parts of prepolymer whose preparation is described in Example I is emulsified in the flask in 2000 parts of water containing 5 parts of dodecylphenoxy polyoxyethylene ethanol non-ionic surfactant of about 900 molecular weight (Igepal CO430, General Aniline and Film). To the emulsion there is added 18 parts of 1-amino-3-aminomethyl-3,5,5-trimethyl cyclohexane all at once with rapid stirring at 1000 r.p.m. The reaction mixture is stirred one-half hour at room temperature and the solid product is recovered in quantitative yield by filtration and air drying at room temperature for 24 hours. A free-flowing powder is obtained, which can be dissolved in isopropanol or dimethylformamide at 20 percent nonvolatile and cast into clear films of good tensile strength and high elongation. The powder can also be converted into films by heating to about 150° C. under about 10,000 pounds per square inch applied pressure in a mold in a hydraulic press. The films have a tensile strength of about 4000 pounds per square inch and elongation at break of 570 percent.

EXAMPLE V

Benzene is used in this example to dilute the prepolymer prior to emulsification. A solution of 200 grams of prepolymer whose preparation is described in Example I and 200 grams of benzene are emulsified in the equipped flask of Example IV in 1500 grams of water using 5 grams of the dodecylphenoxy polyoxyethylene ethanol surfactant of Example IV. The mixture is stirred rapidly at about 1000 r.p.m. and 20 parts of 1-amino-3-aminomethyl-3,5,5-trimethyl cyclo-hexane are added in one portion. The reaction mixture is heated at about 75° C. for 20 minutes to cause aggregation of the polymer particles and is then filtered and air dried at room temperature for 24 hours. The product is obtained in the form of a granular powder which can be readily dissolved in organic solvents, such as, isopropyl alcohol, for instance, at 20 percent nonvolatile and converted into transparent and color-retentive films by evaporation of the solvent.

EXAMPLE VI

In this example an anionic surfactant is used in the emulsion. A suspension of 100 parts of the prepolymer whose preparation is described in Example I and 1000 parts of water are emulsified in an equipped flask as in Example IV by the addition of 5 parts of the ammonium salt of a sulfated n-dodecylphenoxy polyoxyethylene ethanol having a molecular weight of about 2600 (Alipal LO 436, General Aniline and Film). Ten parts of 1-amino - 3 - aminomethyl-3,5,5-trimethyl cyclohexane are added all at once to the emulsion immediately after it is formed, and the mixture is stirred at 1000 r.p.m. overnight at its boiling point. The solid product is recovered by filtration and air drying for 24 hours at room temperature, in the form of a white, granular powder which can be melt-pressed into films or melt-spun into a fiber. The powder is soluble in organic solvents, such as, dimethylformamide, from which it can be cast into clear colorless films which are relatively unaffected by ultraviolet radiation. The percent nonvolatile of the casting solution was 20.

EXAMPLE VII

This example illustrates the use of a 4,4′-dicyclohexylmethane diisocyanate/polypropylene oxide prepolymer modified with bisphenol A and cured with 1-amino-3-aminomethyl-3,5,5-trimethyl cyclohexane. One thousand grams (1.94 equivalent) of polypropylene glycol of molecular weight 1025, 340 grams (0.336 equivalent) of polypropylene glycol of 2025 molecular weight, 70 grams (0.625 equivalent) of bisphenol A (2,2-bis(4-hydroxyphenyl)propane) and 50 grams of xylene were charged to a glass flask with arrangements suitable for the preparation of polyurethane prepolymers. The mixture was heated under conditions of azeotropic distillation for one hour to dry it. The batch temperature of this drying step was 180° C. After cooling the dried mixture of polyols to 63° C., 2.17 grams of dibutyl tin dilaurate and 760 grams (5.8 equivalents) of 4,4′-dicyclohexyl methane diisocyanate were added and stirred in. Heating and stirring were continued for 2 hours at 63 to 90° C. when the viscosity of the prepolymer was 855 stokes, the Gardner color 1 minus and the free isocyanate 5.26 percent.

A mixture of 136 parts of the prepolymer and 1000 parts of water is emulsified in an equipped flask as in Example IV by the addition of 3 parts of the ammonium salt of a sulfated n-dodecylphenoxy polyoxyethylene ethanol of Example VI. The thoroughly emulsified prepolymer is treated with 15.2 parts of 1-amino-3-aminomethyl-3,5,5-trimethyl cyclohexane and the mixture is stirred at 1000 r.p.m. for 3 days at about 25° C. The solid product is recovered by filtration and dried at 60° C. for 24 hours in a forced draft oven. The white solid product upon casting from solution in dimethylformamide at 20 percent nonvolatile produced tough, clear films which were relatively unaffected by ultraviolet radiation.

EXAMPLE VIII

A mixture of 840 grams (1.7 equivalents) of polytetramethylene glycol of 900 molecular weight and 292 grams (0.29 equivalent) of polytetramethylene glycol of 2010 molecular weight was charged to a glass flask having a heating mantel, a thermometer, reflux condenser, water trap, mechanical stirrer and inlet for gaseous nitrogen. Fifty grams of xylene were also added to this mixture. The mixture was heated for about one hour to azeotrope off water, the temperature being 221–223° C. during this period. The temperature of the mixture was then allowed to drop to 37° C. when 490 grams (4.4 equivalents) of 1-isocyanato - 3 - isocyanatomethyl-3,5,5-trimethyl cyclohexane and 1.5 grams of dibutyl tin dilaurate were added and stirred in. Continuous stirring under gaseous nitrogen was maintained for 5½ hours with the temperature of the mixture at 80° C. This vehicle had a nonvolatile content of 92.2 percent, a free isocyanate value of 6.1 percent (NCO), a Gardner color of one minus and a viscosity of 75.2 stokes.

106 parts of the prepolymer, 6 parts of the ammonium salt of sulfated n-dodecylphenoxy polyoxyethylene ethanol of Example VI and 2000 parts water are stirred rapidly at 1000 r.p.m. in an equipped flask as in Example IV. To the emulsion thus produced there are added 13.4 parts of 1-amino-3-aminomethyl-3,5,5-trimethyl cyclohexane with rapid stirring at 1000 r.p.m. to avoid lumping of the product. The reaction mixture is stirred one hour at room temperature, filtered and air dried at room temperature for 24 hours to recover the polymer in the form of small rubbery granules. The yield is quantitative. The polymer is soluble in dimethylformamide from which it can be cast into clear transparent films having tensile strengths of 8500–9500 pounds per square inch, Shore A hardness of about 80 and Shore D hardness of about 35. The percent nonvolatile of the casting solution was 20.

EXAMPLE IX

One hundred parts of prepolymer whose preparation is described in Example I are emulsified in an equipped flask as in Example IV in 1000 parts of water using 10 parts of a 50% by weight solution of trimethyloctadecyl ammonium chloride in ethanol. To the emulsion there is added 10 parts of 1-amino-3-aminomethyl-3,5,5-trimethyl cyclohexane with vigorous stirring at 1000 r.p.m. The mixture is so stirred for about 10 minutes at 70° C. and filtered to recover the resin after washing with water. After air drying at room temperature for 24 hours the yield of white, granular solid is quantitative. The product is soluble in N-methyl-2-pyrrolidone from which it can be cast into clear color-retentive transparent films of about 4500 pounds per square inch tensile strength and about 550 percent elongation at break.

EXAMPLE X

Two hundred parts of an isocyanate-terminated prepolymer containing about 4.9 wt. percent NCO and prepared by heating a mixture of methylene bis(4-cyclohexyl isocyanate) and a polyester having a hydroxyl number of about 91, a molecular weight of about 1230 and derived from adipic acid and a mixture of ethylene and propylene glycols, are dissolved in an equipped flask as in Example IV in 200 parts xylene and suspended with rapid stirring at 1000 r.p.m. and 65–70° C. in 2000 parts of an aqueous solution of a non-ionic surfactant composed of a free acid (pH of 10% solution at 25° C. of 1.5 to 2.5) of complex organic phosphate esters having molecular weight of about 1900 (GAFAC RE–610), containing a total of 20 parts of surfactant. The dispersion is stirred at 1000 r.p.m. and treated all at once with 24.5 parts of methylene bis(4-cyclohexylamine). The stirred reaction mixture is maintained at about 60–70° C. for about one hour by external heating to form an aqueous dispersion of small rubbery particles. The reaction mixture is then cooled to room temperature and the rubbery granular product is washed free of surfactant and dried in a forced-air oven. A portion of the product is dissolved in N-methyl pyrrolidone and cast into films of about 20 mil. thickness. The dry films exhibited ultimate tensile strengths in the range of 5000–6000 p.s.i. and 500–600% elongation at break.

EXAMPLE XI

One thousand parts of an isocyanate-terminated prepolymer containing about 6.55 wt. percent NCO and prepared by heating a mixture of tolylene diisocyanate and a polyester having a hydroxyl number of about 125 and derived from adipic acid and triethylene glycol is dissolved in 1000 parts toluene and the solution is suspended in a 22 liter flask at room temperature in an aqueous solution containing 10,000 grams of water and 5 parts by weight of a surfactant (Pluronic F–108, Wyandotte) comprising a condensate of ethylene oxide with a hydrophobic base formed by condensing propylene oxide with propylene glycol. The suspenesion is stirred vigorously and treated with a solution of 163 parts methylene bis(cyclohexylamine) and 50 parts of 4,4′-butylidene-bis-(6-tert-butyl-metacresol) in 250 N,N-dimethyl formamide. After standing for one hour the reaction mixture is heated gradually to 70° C. to form an aqueous dispersion of small rubbery particles. The mixture is cooled and rubbery cream-colored granules are obtained. The granules are dissolved in N-methyl pyrrolidone and made into 20 mil. films having ultimate tensile strengths of about 3500–4000 p.s.i. and about 450–500% elongation at break.

EXAMPLE XIII

One hundred parts of a polyester polyisocyanate prepolymer derived from the polyester of Example X having a hydroxyl number of about 90, and 4,4′-methylene bis-dicyclohexyl-isocyanate and having an isocyanate content of 4.7 percent, are dissolved in 100 parts toluene and the solution is suspended in 1,000 g. water using 5 g. of the nonionic emulsifier GAFAC RE610 of Example X in a 3-liter, 3-neck, round-bottomed reaction flask equipped as in Example IV. The suspension is heated to 65° C. with continuous stirring at 1000 r.p.m. As soon as the temperature of the mixture had reached 65° C. a solution of 11.8 parts 4,4'-methylene-bis cyclohexylamine in 25 parts N,N-dimethyl formamide is introduced rapidly into the stirred reaction mixture. Solid elastomeric particles begin to form immediately and the reaction is essentially complete in a few minutes. The reaction mixture is stirred one hour at about 70° C. to keep the particles from forming lumps, cooled and filtered. The product is obtained in the form of rubbery particles with the mesh sizes shown on the attached table.

| Run | 1 | 2 | 3 | 4 | 5 | 6 |
|---|---|---|---|---|---|---|
| Surfactant level, percent | 2.5 | 5 | 10 | 20 | 30 | 50 |
| Mesh size, percent (Tyler standard): | | | | | | |
| 8 | 85.8 | 60.9 | 88.2 | 4.0 | 86.7 | 73.8 |
| 10 | 11.1 | 22.0 | 7.6 | 44.3 | 9.0 | 18.0 |
| 14 | 2.8 | 11.8 | 2.5 | 37.4 | 3.1 | 7.3 |
| 20 | 0.3 | 4.2 | 1.7 | 11.8 | 0.9 | 0.9 |
| 30 | | 0.9 | | 2.2 | 0.3 | |
| 40 | | 0.2 | | 0.3 | | |

It can be seen from the data that in the case of this surfactant, a level of about 20% by weight produces the most particles in the very desirable 10 to 20 mesh size range. At the surfactant levels substantially below 20%, for example at 10% by weight surfactant, or at considerably higher levels for example 30% by weight, the particles were of larger size.

EXAMPLE XII

A batch of the elastomeric product of this invention was made in a mixing kettle having a diameter of about 33 inches and a height of about 46 inches. The kettle contained a central impeller having upper and lower blades mounted on a central vertical shaft. Each blade had 5 vertical paddles equally spaced around the central shaft. The diameter of the circle formed by the paddles was 14 inches. On the periphery of the inside of the kettle opposite the blades were positioned three baffles equally spaced around the periphery of the kettle. The baffles extended three inches towards the center of the kettle. In the preparation, 150 pounds of water and 4.5 pounds of xylene were charged to the kettle, and heated to 150° F. while stirring. 0.625 pound of surfactant GAFAC RE610 of Example X was added to the kettle, followed by 0.25 pound of 4,4'-butylidene bis(6-tertiary-butyl-meta-cresol), an anti-oxidant, at 158° F. and with the kettle agitator running at 230 r.p.m. which was the speed maintained during the remainder of the preparation. This agitator speed corresponds to a speed for the outer periphery of the paddles on the blades of 842 feet per minute.

With the kettle contents at 161° F., 20.1875 pounds of a prepolymer similar to that of Example VII were added to the kettle over a one minute period. After another minute 1.35 pounds of 1-amino-3-aminomethyl-3,5,5-trimethylcyclohexane were added rapidly. The kettle contents, which had an upper level between the upper and lower blades, were then stirred for one hour at a temperature of 153 to 154° F. and particulate, solid urea-urethane was formed. At this point, the batch was drained from the kettle and washed with 100 gallons of water at room temperature. A sample of the wash water taken at the end of the washing did not foam which indicated that the surfactant had been removed from the insoluble, elastomeric product particles. These particles which were about 1 millimeter in diameter were placed in stainless steel trays and dried for 2 days in a hot box except that during the night the particles were air-dried outside the box. The drying time in the box included 5 hours the first day at 190 to 210° F. and 6¼ hours the second day at 190 to 210° F. The particles were cast into sheets of 30 mils thickness by the solvent procedure using N-methylpyrollidone as the solvent and measurements taken on the sheets showed an average tensile strength of 5081 p.s.i. and an average elongation of 412%.

It is claimed:

1. A method for the manufacture of solid, urea-urethane particles having a diameter of about 0.001 to 0.3 inch which comprises reacting liquid polyurethane prepolymer of hydrocarbon diisocyanate and urethane-forming polyol, said prepolymer containing free isocyanate groups, with an approximately stoichiometric amount of water-soluble, primary diamine devoid of any hydrogen atom as reactive with an isocyanate group as a primary amine group, said reaction being conducted by forming a dispersion of said prepolymer in a liquid medium, said dispersion having water as the continuous phase, and immediately reacting said prepolymer dispersion having said prepolymer dispersed as particles of about 0.001 to 0.3 inch in diameter with said primary diamine to form solid, urea-urethane particles directly by said reaction as an unstable dispersion from which said solid, urea-urethane particles will settle when not agitated.

2. The methof of claim 1 in which the reaction is conducted by adding the diamine to the aqueous dispersion of the prepolymer.

3. The method of claim 1 in which said liquid medium contains an emulsifying agent.

4. The method of claim 1 in which the diisocyanate is a cycloaliphatic diisocyanate.

5. The method of claim 1 in which the polyol is polyoxyalkylene glycol in which the alkylene groups have 2 to 4 carbon atoms.

6. The method of claim 5 in which the polyoxyalkylene glycol has a molecular weight of about 400 to 4000.

7. The method of claim 2 in which said liquid medium contains an emulsifying agent.

8. The method of claim 7 in which the diisocyanate is a cycloaliphatic diisocyanate.

9. The method of claim 8 in which the polyol is polyoxyalkylene glycol in which the alkylene groups have 2 to 4 carbon atoms.

10. The method of claim 9 in which the diisocyanate is selected from the group consisting of 1-isocyanato-3-isocyanatomethyl-3,5,5-trimethylcyclohexane and 4,4'-dicyclohexylmethane diisocyanate.

11. The method of claim 10 in which the emulsifying agent is an anionic emulsifying agent.

12. The method of claim 10 in which the polyoxyalkylene glycol has a molecular weight of about 400 to 4000.

13. The method of claim 1 in which the particles of prepolymer reacted and particles of solid, particulate urea-urethane produced are about 0.01 to 0.1 inch in diameter.

14. The method of claim 1 in which the prepolymer dispersion contains an aromatic hydrocarbon solvent for the prepolymer.

15 The method of claim 2 in which the prepolymer dispersion contains an aromatic hydrocarbon solvent for the prepolymer.

16. A method for the manufacture of solid, urea-urethane particles having a diameter of about 0.001 to 0.3 inch which comprises reacting liquid polyurethane prepolymer of hydrocarbon diisocyanate having up to about 40 carbon atoms and urethane-forming, aliphatic polyol having a molecular weight of up to about 5000, said prepolymer containing free isocyanate groups, with an approximately stoichiometric amount of water-soluble, primary diamine hydrocarbon having up to about 40 carbon atoms and devoid of any hydrogen atom as reactive with an isocyanate group as a primary amine group, said reaction being conducted by forming a dispersion of said prepolymer in a liquid medium, said dispersion having water as the continuous phase, and immediately reacting said prepolymer dispersion having said prepolymer dispersed as particles of about 0.001 to 0.3 inch in diameter with said primary diamine to form solid, urea-urethane particles directly by said reaction as an unstable dispersion from which said solid, urea-urethane particles will settle when not agitated.

17. The method of claim 16 in which the reaction is conducted by adding the diamine to the aqueous dispersion of the prepolymer.

18. The method of claim 16 in which the prepolymer dispersion contains an aromatic hydrocarbon solvent for the prepoylmer.

19. The method of claim 17 in which the prepolymer dispersion contains an aromatic hydrocarbon solvent for the prepolymer.

20. A method for the manufacture of solid, urea-urethane particles having a diameter of about 0.001 to 0.3 inch which comprises reacting liquid polyurethane prepolymer of hydrocarbon diisocyanate having about 6 to 40 carbon atoms, and urethane-forming polyol, having a major molar amount of aliphatic diol having a molecular weight of about 400 to 4000, said prepolymer containing free isocyanate groups, with an approximately stoichiometric amount of water-soluble, primary aliphatic of cycloaliphatic diamine hydrocarbon having about 2 to 15 carbon atoms and devoid of any hydrogen atom as reactive with an isocyanate group as a primary amine group, said reaction being conducted by forming a dispersion having water as the continuous phase, and immediately reacting said prepolymer dispersion having said prepolymer dispersed as particles of about 0.001 to 0.3 inch in diameter with said primary diamine to form solid, urea-urethane particles directly by said reaction as an unstable dispersion from which said solid, urea-urethane particles will settle when not agitated.

21. The method of claim 20 in which the particles of prepolymer reacted and particles of solid, particulate urea-urethane produced are about 0.01 to 0.1 inch in diameter.

22. The method of claim 21 in which the reaction is conducted by adding the diamine to the aqueous dispersion of the prepolymer.

23. The method of claim 22 in which the polyol is polyoxyalkylene glycol in which the alkylene groups have 2 to 4 carbon atoms.

24. The method of claim 23 in which the diisocyanate is cycloaliphatic diisocyanate.

25. The method of claim 24 in which the diisocyanate is selected from the group consisting of 1-isocyanato-3-isocyanatomethyl-3,5,5-trimethylcyclohexane and 4,4'-dicyclohexylmethane diisocyanate.

26. The method of claim 20 in which the prepolymer dispersion contains an aromatic hydrocarbon solvent for the prepolymer.

27. The method of claim 22 in which the prepoylmer dispersion contains an aromatic hydrocarbon solvent for the prepolymer.

References Cited

UNITED STATES PATENTS

| | | | |
|---|---|---|---|
| 3,281,397 | 10/1966 | Axelrod | 260—77.5 |
| 3,294,724 | 12/1966 | Axelrod | 260—29.2 |
| 3,401,133 | 9/1968 | Grace et al. | 260—29.2 |
| 3,437,624 | 4/1969 | Dawn et al. | 260—29.2 |
| 3,488,272 | 1/1970 | Frisch et al. | 204—181 |
| 3,525,717 | 8/1970 | Butler et al. | 260—75 |

DONALD E. CZAJA, Primary Examiner

M. I. MARQUIS, Assistant Examiner

U.S. Cl. X.R.

117—161 KP; 260—18 N, 18 TN, 30.2, 32.6 N, 33.4 UR, 75 NH, 75 NE, 77.5 AM; 264—210 R, 289